United States Patent [19]

Nichols et al.

[11] Patent Number: 4,929,646

[45] Date of Patent: May 29, 1990

[54] POLYURETHANE FOAM PREPARED USING HIGH FUNCTIONALITY CELL OPENERS

[75] Inventors: Jerram B. Nichols, Alvin; Douglas L. Hunter, Lake Jackson; Ronald M. Herrington, Brazoria; John F. Serratelli, Lake Jackson, all of Tex.; David G. Carey, Sarnia, Canada

[73] Assignee: The Dow Chemical Company, Midland, Mich.

[21] Appl. No.: 270,178

[22] Filed: Nov. 14, 1988

Related U.S. Application Data

[63] Continuation of Ser. No. 186,418, Apr. 26, 1988, Pat. No. 4,863,976.

[51] Int. Cl.$^5$ ............................................. C08G 18/14

[52] U.S. Cl. ..................................... 521/137; 521/159; 521/173; 521/174; 521/175; 521/914; 252/182.24

[58] Field of Search ............... 521/137, 159, 173, 174, 521/175, 914; 252/182.24

[56] References Cited

U.S. PATENT DOCUMENTS 4,607,064 8/1986 Kuhn et al. .......................... 521/914

Primary Examiner—Maurice J. Welsh

[57] ABSTRACT

Flexible polyurethane foams are prepared using certain high molecular weight, high functionality poly(oxyethylene) compounds as cell openers and softeners. These high functionality polyether polyols have been found to be very effective in opening the cells of the foam, even when used in making foams based on PIPA polyols, which are notoriously closed-celled. They are also quite effective in softening foams made using MDI-based polyisocyanates.

10 Claims, No Drawings 4,929,646

1

POLYURETHANE FOAM PREPARED USING HIGH FUNCTIONALITY CELL OPENERS

CROSS REFERENCE TO RELATED APPLICATIONS

This is a continuation, of application Ser. No. 186,418, filed Apr. 26, 1988 now U.S. Pat. No. 4,863,976.

BACKGROUND OF THE INVENTION

This invention relates to the preparation of flexible polyurethane foam, and more particularly to the preparation of such foam using cell opening or softening additives.

In preparing many types of polyurethane foam, particularly the flexible and semi-flexible types, it is necessary that the walls of the individual cells in the foam be ruptured at some point during the foam production. Unless the cells are opened in this manner, the gasses trapped within the cells contract as the foam cools, creating a vacuum in the foam and causing the foam to shrink or collapse.

In many instances, the cell walls will not spontaneously rupture as the foam is made. Accordingly, it is often necessary to promote cell wall rupture either through mechanical means such as crushing, or with the use of certain types of cell opening additives. Certain types of copolymer polyols, particularly those which are prepared by the in situ polymerization of ethylenically unsaturated monomers in a continuous polyol phase, are effective cell openers. Other types of cell openers include certain polyolefins, particularly polybutene and polybutadiene rubbers, and polyethers of up to about 3500 molecular weight which contain a high proportion (usually 50 percent or higher) of oxyethylene units or units derived from butylene oxide. The polyether types are most commonly used when the foam is based on a poly(propylene oxide) polyol.

These cell openers all have certain drawbacks which limit their use or effectiveness. The copolymer polyols must be used in relatively high amounts, so that the copolymer polyol itself becomes a substantial if not major component of the active hydrogen-containing composition which is used to make the foam. When other types of polyols are desired, the copolymer polyol cannot be used in effective amounts. Many of the polyolefins and polybutadienes are less effective than desired and have the additional drawback of bleeding out of the foam, giving it an oily feel and making it more difficult to paint or glue to other materials. They are also incompatible with the other materials used in making the foam, which prevents them from being formulated into the polyol or polyisocyanate blends used in making the foam. Thus, these cell openers must be metered separately into the foam formulation simultaneously with or immediately prior to the start of the foaming reaction. The polyethers are likewise less effective than desired and are often incompatible with the active hydrogen-containing materials used.

Certain types of starting materials provide foams in which the cells particularly difficult to open. Among these are the so-called "PIPA" polyols, which are dispersions of polyurea or polyurethane particles in a continuous polyol phase. Although foam made from these materials otherwise have many desirable properties, it is often very difficult to open their cells. Often, the use of

2 particular surfactants and other raw materials compounds the problem.

Often, particularly when using an MDI-based polyisocyanate, the foam is stiffer and more boardy than desired. In those instances, it is often desirable to provide a means by which the foam is made softer.

Accordingly, it would be desirable to provide a cell opener which is effective at low levels and which is substantially compatible with the foam itself and with at least some of the components used in making the foam. It is further desirable to provide a cell opener which is effective in making certain foam in which the cells are particularly difficult to open, such as foam based on a PIPA polyol. In addition, it would be desirable to provide a means whereby a softer foam is prepared, particularly a foam prepared from an MDI-based polyisocyanate.

SUMMARY OF THE INVENTION

In one aspect, this invention is a method for making polyurethane foam, comprising reacting a reaction mixture comprising (a) at least one relatively high equivalent weight polyester polyol, or a polyether polyol containing at least 50 weight percent of oxypropylene units, an amine-terminated derivative of such polyester or polyether polyol, or polymer polyol based on such polyester or polyether polyol or mixture thereof;

(b) an effective amount of a blowing agent;

(c) a high functionality polyether polyol based on an initiator or initiator mixture having an average of at least about 4.0 active hydrogens per molecule, which polyether polyol has a molecular weight of at least about 5000 and which contains at least about 50 weight percent oxyethylene units and sufficient oxypropylene units to render it compatible with component (a) at the relative proportions thereof present in the reaction mixture, in an amount sufficient to measurably increase the proportion of open cells in the foam as compared with a similar foam prepared in the absence of said high functionality polyether polyol; and (d) at least one polyisocyanate.

In another aspect, this invention is a method for making polyurethane foam, comprising reacting a reaction mixture comprising (a) at least one relatively high equivalent weight polyester polyol, or a polyether polyol containing at least 50 weight percent of oxypropylene units, an amine-terminated derivative of such polyester or polyether polyol, or polymer polyol based on such polyester or polyether polyol or mixture thereof;

(b) an effective amount of a blowing agent;

(c) from about 1 to about 10 parts, per 100 parts of component (a), of a polyether polyol based on an initiator or initiator mixture having an average of at least about 4.0 active hydrogens per molecule, which polyether polyol has a molecular weight of at least about 5000 and which contains at least about 50 weight percent oxyethylene units and sufficient oxypropylene units to render it compatible with component (a) at the relative proportions thereof present in the reaction mixture: and (d) at least one polyisocyanate which is based on MDI.

In another aspect, this invention is an active hydrogen-containing composition comprising (a) at least one relatively high equivalent weight polyester polyol or polyether polyol containing at least 50 weight percent of oxypropylene units, an amine-terminated derivative of such polyester or polyether polyol, or polymer polyol based on such polyester or polyether polyol: (b) an effective amount of a blowing agent: and (c) a high functionality polyether polyol based on an initiator or initiator mixture having an average of at least about 4.0 active hydrogens per molecule, which polyether polyol has a molecular weight of at least about 5000 and which contains at least about 50 weight percent oxyethylene units and sufficient oxypropylene units to render it compatible with component (a) at the relative proportions thereof present in the reaction mixture, in an amount sufficient to measurably increase the proportion of open cells in a foam made by reacting the active hydrogen-containing composition with a polyisocyanate as compared with a similar foam prepared in the absence of said high functionality polyether polyol.

It has surprisingly been found that by using the high functionality polyether polyol described herein, polyurethane foams having significantly greater proportions of open cells are prepared. Accordingly, less shrinkage and distortion of the foam is experienced, and the need to mechanically open the cells is reduced or eliminated. It is further surprising that the high functionality polyether polyol is quite effective at very low levels, and thus has minimal effect on the other desirable properties of the foam. An additional advantage is that the high functionality polyether polyol is compatible with the polyol used in the foam formulation, and can be blended into an active hydrogen-containing composition prior to foaming. The high functionality polyether polyol also exhibits minimal tendency to leach out of the foam. It has been found that this high functionality polyether polyol is particularly effective in the preparation of foam from PIPA polyols.

In the preparation of foams using a polyisocyanate based on MDI, the use of the polyether polyol component (c) provides substantial softening of the foam, and often provides improved cell opening as well.

DETAILED DESCRIPTION OF THE INVENTION

In this invention, a particular high functionality polyether polyol is used to promote the formation of an open-celled or softened polyurethane foam. The high functionality polyether polyol used herein is based on an initiator or initiator mixture having an average of at least about 4.0 active hydrogens per molecule. The high functionality polyether polyol further has a molecular weight of at least about 5000 and contains at least about 50 weight percent oxyethylene units. It also contains sufficient oxypropylene units to render it compatible with the relatively high equivalent weight polyol used as component (a) herein, at the relative proportions thereof present in the reaction mixture.

The high functionality polyether polyol advantageously is based on an initiator or mixture thereof having an average of at least about 4.0 , preferably about 4.5, and more preferably at least about 5.0 active hydrogens per molecule. The initiator advantageously contains an average of up to about 16, preferably up to about 12, and more preferably up to about 8 active hydrogens per molecule. Most preferably, the initiator contains an average from about 5.0 to about 8.0 active hydrogens per molecule. Examples of such initiators are sucrose, methyl glucoside, ethylene diamine, diethylene triamine and low molecular weight alkylene oxide adducts thereof and sorbitol, or mixtures thereof with lower functionality initiators wherein the mixture has an average functionality of at least about 4.0.

The high functionality polyether polyol also advantageously has a molecular weight of at least about 5000, preferably at least about 7500, more preferably at least about 10,000. There is no specific maximum molecular weight as long as the high functionality polyether polyol is liquid and of a viscosity such that it can be processed in foaming equipment. Often, very high molecular weight high functionality polyether polyols can be diluted with an inert solvent, such as water or component (a), to reduce its viscosity to processable levels. Preferably, the molecular weight of the high functionality polyether polyol is up to about 100,000, more preferably up to about 50,000.

The high functionality polyether polyol contains at least about 50 weight percent oxyethylene units, and sufficient oxypropylene ($-CH_2-CH(CH_3)-O-$) units to render it compatible with the component (a) used in making the foam. It has been found that when the oxyethylene content is less than about 50 weight percent, the high functionality polyether polyol is substantially less effective. Preferably, the high functionality polyether polyol contains about 50 to about 90, more preferably about 60 to about 85, most preferably about 65 to about 80 weight percent oxyethylene units and the remainder oxypropylene units and the residue from the initiator material(s).

As mentioned before, the high functionality polyether polyol can be used neat or, if necessary, diluted with a solvent or diluent material which reduces its viscosity. The solvent or diluent material can be any material which reduces the viscosity of the high functionality polyether polyol, but does not have any undesired adverse effect on the reactivity of the foam formulation, or the properties of the resulting foam. Thus, preferred diluents include water, which will also act as a blowing agent, or a polyol, which forms all or part of component (a) in this invention.

When the high functionality polyether polyol is blended with component (a) prior to foaming, it is usually not necessary to use a diluent, even when very high viscosity high functionality polyether polyols are used.

The high functionality polyether polyol is used in an amount sufficient to measurably increase the proportion of open cells in the foam as compared with a similar foam prepared in the absence of said high functionality polyether polyol, or to measurably soften the foam (e.g., reduce its 65 percent IFD). A reduction in the proportion of open cells can be indirectly determined by measuring the amount of shrinkage exhibited by a foam sample as it cools down from the exotherm released in its preparation. Shrinkage is advantageously decreased by about 3 percentage points or more, preferably by about 5 percentage points or more, more preferably about 10 percentage points or more, and most preferably about 20 percentage points or more, as compared to the shrinkage exhibited by foams made without the high functionality polyether polyol. In addition to the reduced shrinkage, the foam is usually easier to crush, that is, less force is required to open the remaining closed cells. Advantageously about 0.1 to about 10, preferably about 0.2 to about 5, more preferably about 0.2 to about 3 parts by weight of the high functionality polyether polyol are used per 100 parts by weight of component (a).

A softening effect is typically seen, particularly when the foam is made using an MDI-based polyisocyanate, when about 1 to about 20, preferably about 2 to about 10, more preferably about 3 to about 8, parts by weight of the high functionality polyether polyol are used per 100 parts of component (a).

In making a polyurethane foam according to this invention, a reaction mixture is used which comprises at least one relatively high equivalent weight polyester polyol, or a polyether polyol containing at least 50 weight percent of oxypropylene units, an amine-terminated derivative of such polyester or polyether polyol, or a polymer polyol based on such polyester or polyether polyol (sometimes referred to herein as "component (a)"). Such polyols generally process well to provide a polyurethane foam having good properties. In addition, the high functionality polyether polyol of this invention is particularly effective when this type of polyol is used. Of these, the polyether polyols themselves, amine-terminated derivatives thereof and polymer polyols based on the polyether polyol are preferred, as the high functionality polyether polyol is especially effective when used in conjunction with such polyethers.

The component (a) material has an equivalent weight suitable for the preparation of flexible polyurethane foam. Advantageously, it has an equivalent weight from about 500 to about 5000, preferably about 800 to about 3000 preferably about 1000 to about 2500. In general, this material also advantageously has an average functionality from about 1.5 to about 4, more preferably about 1.8 to about 3.0. When the polyisocyanate is MDI or based on MDI, the component (a) material advantageously has an average functionality of about 1.5 to about 2.2, more preferably about 1.8 to about 2.1. With respect to component (a), and cross-linkers and chain extenders used in this invention, the term functionality refers to the average number of groups per molecule which contain one or more active hydrogen atoms.

Most preferred materials used as component (a) herein are polymers of propylene oxide having an average functionality of about 1.8 to about 3.0 and an equivalent weight of about 1000–2000 which are optionally end-capped with up to about 30, preferably up to about 20 weight percent ethylene oxide, as well as amine-terminated derivatives thereof and polymer polyols prepared therefrom, and mixtures thereof.

The amine-terminated derivatives of the polyether polyols can be prepared in the reductive amination of the polyether polyol using ammonia or a primary amine. Alternatively, the amine-terminated derivative can be prepared by reductively aminating the polyol with ammonia and then reacting the resulting primary amine with an ethylenically unsaturated compound such as acrylonitrile to form the corresponding secondary amine, as described in U.S. Pat. No. 3,236,895. Aromatic, amine-terminated polyether can be prepared by reacting the polyol with a diisocyanate, followed by hydrolyzing the free isocyanate groups to amine groups, as described for example in U.S. Pat. No. 4,578,500 Alternatively, the polyol can be reacted with a material such as o- or p-chloronitrobenzene to form an ether, followed by reduction of the nitro groups to corresponding amine group, as described in copending application Ser. No. 035,121, filed Apr. 6, 1987, incorporated herein by reference.

Several types of polymer polyols based on polyether or polyester polyols are useful as component (a) in this invention. In this invention, a polymer polyol refers to a dispersion of a polymer in a continuous polyol phase. The dispersed polymer can be a polymer of one or more ethylenically unsaturated monomers, an epoxy resin, a polyurethane or a polyurea. Of these, dispersions of styrene and/or acrylonitrile polymer and copolymers, polyurea dispersions (the so-called ("PHD polyols") and polyurea-polyurethane dispersions (the so-called PIPA polyols) are preferred. Such dispersions are described, for example, in U.S. Pat. Nos. 4,374,209, 4,092,275 and 4,042,537, incorporated herein by reference.

As mentioned before, this invention is particularly effective when component (a) comprises a PIPA polyol such as described in U.S. Pat. No. 4,374,209. These polyols form notoriously closed-celled foams which are very difficult to open. This invention has been found to be very effective even when PIPA polyols are used as component (a).

When the component (a) material is a polyether polyol which is prepared in a base-catalyzed polymerization of one or more alkylene oxides, or a derivative of such a polyol, it is preferred that the base catalyst is neutralized and/or removed from the polyol prior to making a foam therewith. The high functionality polyether polyol used herein is much more effective when the catalyst is neutralized and/or removed.

The other critical component used in making foam according to this invention is a blowing agent. Any material which generates a gas under the conditions of the reaction of the active hydrogen-containing component and the polyisocyanate can be used has a blowing agent herein. Suitable blowing agents include low boiling organic compounds, water, the so-called "azo" blowing agents, finely divided solids and the like. Gases such as air, nitrogen, carbon dioxide and the like may also be used. Preferred are water and low boiling halogenated alkanes such as refrigerant 11, refrigerant 12, refrigerant 22, refrigerant 123, refrigerant 112, methylene chloride and the like.

The blowing agent is used in an amount sufficient to provide the foam with a desired density. Typically, a density from about to 0.5 to about 30, preferably about 1 to about 6, more preferably about 1 to about 3 pounds per cubic foot, is desired. When water is the sole blowing agent, such densities are obtained when about 0.1 to about 8, preferably about 2 to about 6 parts per 100 parts by weight of component (a) are used. However, when an aminated polyether is used as component (a), up to 10 parts water can be used. Such densities can also be obtained with the use of about 2 to about 40, preferably about 5 to about 20 parts by weight of halogenated alkane blowing agent per 100 parts by weight component (a).

Either aliphatic or aromatic polyisocyanates can be used in this invention to make foam. Suitable aliphatic polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or -4,4'-diphenylmethane diisocyanate ($H_{12}MDI$), isophorone diisocyanate, and the like.

Suitable aromatic polyisocyanates include, for example, 2,4- and/or 2,6-toluene diisocyanate (TDI), 2,4'-diphenylmethane diisocyanate, 1,3- and 1,4-phenylene diisocyanate, 4,4'-diphenylmethane diisocyanate (including mixtures thereof with minor quantities of the 2,4'-isomer and/or 2,2'-isomer), 1,5-naphthylene diisocyanate, triphenylmethane-4,4',4''-triisocyanate, polyphenylpolymethylene polyisocyanates, and the like. When the polyisocyanate is MDI or a derivative of MDI (i.e, a polyisocyanate based on MDI), especially a mixture including a polymeric MDI, it is preferred that the amine-terminated compound be substantially difunctional, i.e., have an average functionality of about 1.5 to about 2.2, preferably about 1.8 to about 2.1, more preferably about 1.9 to about 2.05. It has been found that the use of substantially difunctional polyols, as opposed to the higher functionality polyols conventionally used in making flexible foam, delays the gelling of the reaction mixture and thereby further promotes the formation of good quality foam. Mixtures of a relatively high equivalent weight compound having an actual functionality of about 1.5 to about 1.95 and another relatively high equivalent weight compound having an actual functionality of about 2.2 or higher wherein the average functionality of the mixture is from about 1.5 to about 2.2 can be used.

In addition, derivatives and prepolymers of the foregoing polyisocyanates such as those containing urethane, carbodiimide, allophanate, isocyanurate, acylated urea, biuret, ester and similar groups are useful herein. Of these, prepolymers of TDI and MDI, and the so-called "liquid MDI" products which contain carbodiimide groups and have an equivalent weight of about 130-150, are of particular significance.

Of the foregoing polyisocyanates, TDI, MDI, isophorone diisocyanate, $H_{12}MDI$, hexamethylene diisocyanate, cyclohexane diisocyanate and derivatives thereof are preferred due to their cost, commercial availability and performance. TDI, MDI and derivatives of MDI are more preferred. TDI, particularly mixtures of the 2,4- and 2,6-isomers, is especially preferred.

The polyisocyanate is advantageously used in an amount sufficient to provide an isocyanate index of about 60-200, preferably about 90-125, more preferably about 95-110, although higher indices may sometimes be used, such as in the production of dual hardness foam. At higher indices, trimerization of the polyisocyanate occurs, causing the foam to become less flexible. At lower indices, insufficient curing occurs, causing the foam to have poor properties. When MDI or a derivative thereof is used as the polyisocyanate, preferred isocyanate indices are from about 60-110, with 70-103 being more preferred, as MDI tends to provide a boardlike foam at indices greater than about 110, but provides a highly resilient foam at indices as low as about 60. The "isocyanate index" is 100 times the ratio of isocyanate groups to active hydrogen-containing groups contained in the mixture which reacts to form the foam.

Flexible polyurethane foam is prepared according to this invention by contacting the various components under conditions such that the components react to form a cellular polymer. Generally, the reaction mixture may contain additional components such as crosslinkers, catalysts, surfactants, colorants, high functionality polyether polyols, flame retardants, antioxidants, mold release agents and the like, which may vary according to the desired attributes of the foam, and whether the foam is a molded or slabstock foam. The use of such additional components is well understood in the art.

A catalyst for the reaction of the active hydrogen-containing components and the polyisocyanate is also advantageously used in making foam according to this invention. Although a wide variety of materials are known to be useful for this purpose, the most widely used and preferred catalysts are the tertiary amine catalysts and the organometallic catalysts.

Exemplary tertiary amine catalysts, include, for example, triethylenediamine, N-methyl morpholine, N-ethyl morpholine, diethyl ethanolamine, N-coco morpholine, 1-methyl-4-N,N-dimethylaminoethyl piperazine, 3-methoxy-N-dimethylpropylamine, N,N-diethyl-3-diethylaminopropylamine, dimethylbenzylamine, bis(2-dimethylaminoethyl)ether, and the like. Tertiary amine catalysts are advantageously employed in an amount from about 0.01 to about 5, preferably about 0.05 to about 2 parts per 100 parts by weight of component (a).

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate, mercaptoalkyltin compounds and the like. Other suitable catalysts are taught, for example, in U.S. Pat. No. 2,846,408. Advantageously, about 0.001 to about 0.5 part by weight of an organometallic catalyst is used per 100 parts of component (a).

Cross-linkers may be used, particularly in making molded foam or high resiliency slabstock foam, in order to improve load-bearing and processing. Suitable such cross-linkers include alkanolamines and other compounds of about 200 or lower equivalent weight having about 3-8, preferably about 3-4, active hydrogen-containing groups per molecule. Exemplary such compounds are glycerine and trimethylolpropane, as well as other alkylene triols. Preferred, however, are alkanolamines such as diethanolamine, triisopropanolamine, triethanolamine, diisopropanolamine, adducts of 4-8 moles of ethylene oxide and/or propylene oxide with ethylene diamine and the like, and ammonia and the like. Most preferred, on the basis of its optimum reactivity, is diethanolamine. When used, about 0.1 to about 4 parts of the cross-linker are advantageously employed per 100 parts of component (a).

Chain extenders may also be used to further improve the load-bearing of the foam. "Chain extenders," for the purposes of this invention, include compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3-propylene glycol, 1,4-butylene glycol, 1,6-hexamethylene glycol, diethylene glycol, triethylene glycol, dipropylene glycol, tripropylene glycol, 1,4-cyclohexanedimethanol and the like. Amine chain extenders include diethyltoluene diamine, phenylene diamine, methylene bis(o-chloroaniline), NaCl-blocked methylene bis(aniline), toluene diamine, aromatic diamines which are substituted for at least one of the carbon atoms adjacent to the amine groups with a lower alkyl group, and the like. Such chain extenders, when used, are advantageously employed in a minor amount, i.e., from about 2 to about 30 parts per 100 parts component (a). It is usually preferable, however, to prepare the foam in the substantial absence of a chain extender.

In order to make a stable foam, i.e., one which does not collapse or contain significant quantities of large pores, it is preferred to employ a surfactant which stabilizes the foaming reaction mixture against collapse until the mixture is sufficiently cured to maintain its cellular configuration. Suitable surfactants include siloxane-/poly(alkylene oxide) copolymers as described, for example, in U.S. Pat. Nos. 3,887,500 and 3,957,842. The selection and use of such surfactants in preparing foams is well-known.

According to this invention, foam is prepared by mixing all reactive components, catalysts, and optional ingredients and permitting them to react. This reaction can be conducted via the formation of a prepolymer, in which most or all of component (a) is reacted with an excess of the polyisocyanate in a first step, followed by the reaction of the prepolymer in a second step with the remaining components. However, it is preferred to form the foam in a one-shot process wherein most or all of component (a) is reacted with the polyisocyanate simultaneously with the other components. In preparing molded foam, all components except the polyisocyanate are preferably blended together and injected as a single stream into a mixing head. However, certain components such as catalysts or halogenated methane blowing agents are sometimes blended with the polyisocyanate. In addition, the water and surfactant, when used, can be introduced as a separate stream, if desired. The polyisocyanate is added to the mixing head as a separate stream where it is mixed with the other components and injected into the mold. In performing the mixing and mold filling steps, conventional, low pressure apparatus can be used, or high pressure impingement mixing processes, such as a reaction injection molding process, can be used. Generally, the components are mixed at approximately room temperature, although components such as pure MDI which are solid at room temperature may be heated above their melting points.

In one molding technique (hot molding process), the reactants are placed into a mold which is at ambient temperature. After filling, the mold is placed into an oven at a temperature of about 150° C. to about 275° C. to effect curing. In a second technique (cold molding process), the reactants are placed into a mold which is preheated to about 30° C. to about 75° C. After the mold is filled, it is placed in a 70° C.–150° C. oven to effect cure. In a third technique, the filled mold is maintained at ambient temperature during the curing process. In this third technique, the mold may or may not be preheated.

Sufficient of the reaction mixture is placed into the mold so that, after expansion, the mixture completely fills the mold. Advantageously, a small excess of material is added over that minimally required to fill the mold. After filling the mold, the reaction mixture is permitted to cure in the mold at least to a state which permits the foam to be removed without undesired permanent distortion. In typical commercial procedures, an in-mold cure time of about 2 to about 30 minutes is adequate for this purpose. If required, the foam can be postcured by heating to about 50° C. to about 120° C. for a period of about 10 minutes to about 24 hours, preferably about 20 minutes to about 2 hours.

In making slabstock foam, the reaction mixture also advantageously contains a surfactant and catalyst as described before. Cross-linkers, although they may be used, are often omitted from slabstock formulations. In the commercial production of slabstock foam, the components can be and typically are introduced individually to a mixing head where they are thoroughly blended and metered onto a bed where foaming takes place. However, the components, except for the polyisocyanate, can be preblended if desired. The components are advantageously at room temperature or a slightly elevated temperature when blended in the mixing head, although preheating may be necessary in some instances to melt components which are solid at room temperature.

It may be necessary or desirable to mechanically open the cells of the foam during or after cure. This can be done by crushing the foam, puncturing the foam, vacuum crushing the foam, or by releasing the pressure in the mold at a proper stage of cure as taught in U.S. Pat. No. 4,579,700, incorporated herein by reference. However, due to the presence of the high functionality polyether polyol used in this invention, the postcure shrinkage associated with inadequate cell opening is usually substantially reduced or eliminated, thereby reducing or eliminating the need to mechanically open the cells, as well as the force and energy required when mechanical cell opening is needed.

The foam of this invention is useful, for example, as bedding, furniture cushioning, padding, carpet underlayment, attached cushion carpet backing, automobile head rests, crash pads, door handles, head liners, seating and the like.

The following examples are provided to illustrate the invention but are not intended to limit the scope thereof. All parts and percentages are by weight unless otherwise indicated.

EXAMPLE 1

Molded polyurethane foams are prepared in this example using the formulation set out in Table I.

TABLE I

| Component | Parts by Weight |
|---|---|
| Polyol A [1] | 50 |
| Copolymer Polyol A [2] | 50 |
| Diethanolamine | 1.7 |
| Water | 3.8 |
| triethylene diamine solution [3] | 0.12 |
| bis(N,N-dimethyl aminoethyl)ether [4] | 0.075 |
| Silicone Surfactant B [5] | 1.65 |
| dibutyltin-dialkylmercaptide | 0.0042 |
| bis(N,N-dimethylaminoethyl)amine | 0.24 |
| 80/20 Toluene diisocyanate [6] | 105 index |
| Cell opener | Variable |

[1] A nominally trifunctional poly(propylene oxide) having an equivalent weight of about 1650 and about 14% by weight ethylene oxide end-capping.
[2] A copolymer polyol containing Polyol A as the base poyol and 25% dispersed 70/30 styrene/-acrylonitrile copolymer particles.
[3] A 33% solution in dipropylene glycol.
[4] As a 10% solution in Polyol A.
[5] Niax Y-10184 surfactant, sold by Union Carbide Corporation.
[6] A mixture of 80% of the 2,4- isomer and 20% of the 2,6- isomer.

Polyurethane foam Comparative Sample A and Sample Nos. 1–12 are prepared by blending all components except the polyisocyanate. This "B-side" blend is then mixed with the polyisocyanate and shot into a 15"×15"×4.5" aluminum mold which is preheated to 140° F. The mixing is done using a nominal 150 lb/min low pressure foam dispensing machine. The formulation is permitted to react in the mold for 120 seconds at ambient temperature and 240 seconds in a 250° F. oven, after which the part is immediately demolded.

Comparative Sample A is prepared without a high functionality polyether polyol. Sample Nos. 1–2 are made using Cell Opener A, a nominally 6.9 functional random copolymer of 75 percent ethylene oxide (EO) and 25 percent propylene oxide (PO) having an approximate molecular weight of 35,000. Cell Opener A is added as a 70/30 mixture with water. The other water in the formulation is reduced so that the total water content is as reported in Table I. The amount of Cell Opener A used is as reported in Table II.

Sample Nos. 3-8 and Comparative Sample B are made using Cell Openers B, C or D in amounts indicated in Table II. These are similar to Cell Opener A, except they are used neat, and their respective molecular weights are 10,000, 12,500 and 15,000.

To determine the amount of shrinkage, each foam is left uncrushed for 24 hours after demold. Each foam is then inspected for the area of greatest shrinkage. The thickness of the foam at the point of greatest shrinkage is measured. Percent shrinkage is then determined by the formula $$100\% \times (T-P)/T$$

wherein T represents the thickness of the mold and P represents the thickness of the foam at the point of maximum shrinkage. The results are as reported in Table II following.

TABLE II

| Sample No | Cell Opener | Parts by Weight | % Shrinkage |
|---|---|---|---|
| A* | None | 0 | 39 |
| 1 | A | 0.25 | 27 |
| 2 | A | 0.5 | 28 |
| B* | B | 0.25 | 42 |
| 3 | B | 0.5 | 0 |
| 4 | C | 0.25 | 35 |
| 5 | C | 0.5 | 0 |
| 6 | D | 0.1 | 37 |
| 7 | D | 0.25 | 9 |
| 8 | D | 0.5 | 0 |

*Not an example of this invention.

The data in Table II shows the effectiveness of the high functionality polyether polyols used in this invention. All are very effective at very low levels of use. Comparative Sample B is comparative only because Cell Opener B is not effective at the 0.25 part level. However, Cell Opener B is very effective at a slightly higher level of use. Similarly, although Cell Opener C is only slightly effective at the 0.25 part level, it is very effective at the 0.5 part level. Cell Opener D, shows slight effectiveness at a level as low as 0.1 part, and is very effective at 0.25 part or higher. When the high functionality polyether polyol has a lower molecular weight, a high use level is required to obtain good results. For example, a high functionality polyether polyol similar to Cell Opener B, except its molecular weight is substantially below 5000, provides good cell opening only when used in amounts substantially in excess of one part. When the molecular weight of the high functionality polyether polyol drops below about 5000, much greater amounts are required. Similarly, when the functionality of the polyether polyol is less than about 4.0, greater amounts are required to provide improvements in cell opening, and often, equivalent improvements in cell opening cannot be obtained at all.

EXAMPLE 2

In a manner similar to that described in Example 1, polyurethane foams are prepared from a formulation including 100 parts by weight of a 10% solids PIPA polyol prepared in accordance with U.S. Pat. No. 4,374,207, 4 parts water, diethanolamine, a mixture of amine catalysts, a silicone surfactant and varying amounts of a cell opener. The polyisocyanate is an 80/20 mixture of the 2,4- and 2,6- isomers of TDI, and the isocyanate index is 100. In Comparative Sample C, no high functionality polyether polyol is used. The amounts of high functionality polyether polyol in Examples 9-11 are as disclosed in Table III following.

TABLE III

| Sample No. | Cell Opener | Parts by Weight | % Shrinkage |
|---|---|---|---|
| C* | None | 0 | 57.3 |
| 9 | C | 0.5 | 56.1 |
| 10 | C | 1.0 | 49.4 |
| 11 | C | 2.25 | 17.3 |

*Not an example of this invention.

This PIPA-based formulation is one which is known to be particularly difficult to produce open cells. However, the high functionality polyether polyol provides significant reduction in shrinkage compared to the control.

EXAMPLE 3

In a manner similar to that described in Example 1, polyurethane foams are prepared from the formulation described in Table IV.

TABLE IV

| Component | Parts by Weight |
|---|---|
| Polyol C [1] | 100 |
| water | 4.5 |
| triethylenediamine solution [2] | 0.45 |
| bis(N,N-dimethyl aminoethyl) ether | 0.15 |
| silicone surfactant [3] | 0.5 |
| silicone surfactant [4] | 0.5 |
| Polymeric MDI [5] | 100 index |
| Cell Opener | variable |

[1] A nominally trifunctional 5000 molecular weight poly(propylene oxide) containing about 16% ethylene oxide end-capping.
[2] A 33% solution in dipropylene glycol.
[3] DC-5241, sold by Dow Corning Corporation.
[4] DC-5043, sold by Dow Corning Corporation.
[5] A 2.3 functional, 131 equivalent weight blend of MDI and polymeric MDI, in which 85% of the MDI is the 4,4'-isomer.

Foam Sample Nos. 12-13 and Comparative Sample D are prepared from the formulation described in Table V. Comparative Sample D contains no high functionally polyether polyol, whereas Sample Nos. 12 and 13 contain 3.0 and 5.0 parts of Cell Opener A, respectively. Shrinkage and physical properties of the foams are measured, and found to be as reported in Table V following.

TABLE V

| Property | Sample No. D* | 12 | 13 |
|---|---|---|---|
| Parts Cell Opener | 0 | 3 | 5 |
| Density, pcf | 2.2 | 2.3 | 2.3 |
| Tensile Strength, psi [1] | 26.6 | 26.0 | 26.0 |
| Elongation, % [1] | 101 | 95 | 92 |
| Tear Strength, pli [2] | 1.4 | 1.4 | 1.2 |
| 25% ILD, pounds [3] | 71 | 68 | 68 |
| 65% ILD, pounds [3] | 185 | 176 | 170 |

*Not an example of this invention.
[1] ASTM D-3574-81 Test E.
[2] ASTM D-3574-81 Test F.
[3] ASTM D-3574-81 Test B. IFD is indentation load deflection.

Excellent improvement in cell opening is obtained, along with a desirable softening of the foam, as indicated by decreasing ILD values. Other properties remain substantially unchanged, as desired.

EXAMPLE 4

In this example, two sets of experiments are run, using the formulations and conditions set out in Example 1 to prepare polyurethane foam Sample Nos. 14–23. In Sample Nos. 14, 16, 18, 20 and 22, the Polyol A component is not neutralized, and contains about 1000 ppm potassium hydroxide In Sample Nos 15, 17, 19, 21 and 23, the Polyol A component is acid treated and contains about 300 ppm potassium hydroxide.

Cell opener A is used in Sample Nos. 14–18. In Sample Nos. 20–23, a high functionality polyether polyol similar to Cell Opener A is used, except its molecular weight is only 5000 (designated Cell Opener E). The amount of high functionality polyether polyol, and the results are indicated in Table VI following.

TABLE VI

| Sample No. | Cell opener Type | Amount[1] | Polyol A Neutralized? | Shrinkage |
|---|---|---|---|---|
| 15 | E | 1.0 | No | 29% |
| 16 | E | 1.0 | Yes | 39% |
| 17 | E | 1.5 | No | 31% |
| 18 | E | 1.5 | Yes | 7% |
| 19 | E | 3.0 | No | 0% |
| 20 | E | 3.0 | Yes | 0% |
| 21 | A | 0.5 | No | 32% |
| 22 | A | 0.5 | Yes | 0% |
| 23 | A | 1.0 | No | 0% |
| 24 | A | 1.0 | Yes | 0% |

[1]Parts by weight per 100 parts by weight Polyol A and Copolymer Polyol A.

As can be seen from the data in Table VI, the neutralization of the polyol tends to reduce the level of high functionality polyether polyol needed to reduce shrinkage to negligible levels. In addition, the higher molecular weight high functionality polyether polyol is shown to be more effective in reducing shrinkage than the 5000 molecular weight Cell Opener E, although Cell Opener E also works very well.

What is claimed is:

1. An active hydrogen-containing composition comprising
   (a) at least one relatively high equivalent weight polyester polyol or polyether polyol containing at least about 50 weight percent of oxypropylene units, an amine-terminated derivative of such polyester or polyether polyol, or polymer polyol based on such polyester or polyether polyol or mixture thereof;
   (b) a high functionality polyether polyol based on an initiator or initiator mixture having at least about 4.0 active hydrogens per molecule, which high functionality polyether polyol has a molecular weight of at least about 5000 and contains at least about 50 weight percent oxyethylene units and sufficient oxypropylene units to render it compatible with component (a) at the relative proportions thereof present in the reaction mixture, in an amount sufficient to measurably increase the proportion of open cells in a form made by reacting the active hydrogen-containing composition with a polyisocyanate as compared with a similar foam prepared in the absence of said high functionality polyether polyol.

2. The composition of claim 1 wherein the high functionality polyether polyol is based on a 4.0 to 8.0 functional initiator, and has a molecular weight from about 10,000 to about 50,000.

3. The composition of claim 2 wherein component (a) is a polyether polyol containing at least about 50 weight percent of oxypropylene units, or an amine-terminated derivative thereof or a polymer polyol based thereon, which polyether polyol has an average functionality from about 1.8 to about 4 and an equivalent weight from about 800 to about 3000.

4. The composition of claim 3 wherein the reaction mixture further comprise effective amounts of a surfactant and a catalyst.

5. The composition of claim 4 wherein the high functionality polyether polyol is present in an amount from about 0.2 to about 5 parts per 100 parts of component (a).

6. The composition of claim 5 wherein component (a) comprises a PIPA polyol.

7. A high functionality polyether polyol based on an initiator or initiator mixture having at least about 4.0 active hydrogens per molecule, which high functionality polyether polyol has a molecular weight of at least about 5000 and contains at least about 50 weight percent oxyethylene units.

8. The high functionality polyether polyol of claim 7 which has a molecular weight of at least about 10,000.

9. The high functionality polyether polyol of claim 8 which contains about 60 to about 85 weight percent oxyethylene units and the remainder oxypropylene units and the residue from said initiator or initiator mixture, and wherein said initiator or initiator mixture has an average of at least about 4.5 active hydrogens per molecule.

10. The high functionality polyether polyol of claim 9 which has a molecular weight from about 10,000 to about 50,000, contains about 65 to about 80 weight percent oxyethylene units and the remainder oxypropylene units and the residue from said initiator or initiator mixture, and wherein said initiator or initiator mixture has an average of about 5.0 to about 8.0 active hydrogens per molecule.

* * * * *